United States Patent
Poon et al.

(10) Patent No.: US 12,341,753 B2
(45) Date of Patent: *Jun. 24, 2025

(54) ARP-BASED ANNOTATIONS FOR VIRTUAL MACHINES

(71) Applicant: VMware LLC, Palo Alto, CA (US)

(72) Inventors: Arnold Poon, San Mateo, CA (US); Sirisha Myneni, Santa Clara, CA (US); Rajiv Mordani, Fremont, CA (US); Aditi Vutukuri, Milpitas, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,035

(22) Filed: Apr. 2, 2024

(65) Prior Publication Data
US 2024/0348584 A1  Oct. 17, 2024

Related U.S. Application Data

(63) Continuation of application No. 17/872,846, filed on Jul. 25, 2022, now Pat. No. 11,949,660, which is a (Continued)

(51) Int. Cl.
*H04L 9/40* (2022.01)
*G06F 9/455* (2018.01)
(Continued)

(52) U.S. Cl.
CPC ...... *H04L 63/0263* (2013.01); *G06F 9/45558* (2013.01); *H04L 61/103* (2013.01);
(Continued)

(58) Field of Classification Search
CPC .............. H04L 63/0263; H04L 61/103; H04L 63/0245; H04L 69/22; H04L 63/0236;
(Continued)

(56) References Cited

U.S. PATENT DOCUMENTS

2013/0315246 A1* 11/2013 Zhang ................... H04L 61/103
370/392
2015/0071289 A1* 3/2015 Shin ....................... H04L 45/745
370/392

(Continued)

OTHER PUBLICATIONS

VMware®, "Reference Design: VMware® NSX for vSphere (NSX) Network Virtualization Design Guide", dated Jan. 2018, 167 pages.
(Continued)

*Primary Examiner* — Mohammad W Reza
(74) *Attorney, Agent, or Firm* — King Intellectual Asset Management

(57) ABSTRACT

Solutions for ARP-based annotations for virtual machines. In some solutions, a hypervisor implemented in a first host might determine that a first process is executing on the first host. The hypervisor can determine first context information for the first process, generate an Address Resolution Protocol (ARP) request, and/or transmit a first packet comprising the ARP request and the context information to a central controller as an indication that the first process is executing on the first host.

20 Claims, 6 Drawing Sheets

Related U.S. Application Data continuation of application No. 16/351,083, filed on Mar. 12, 2019, now Pat. No. 11,431,678.

(51) Int. Cl.
*H04L 61/103* (2022.01)
*H04L 69/22* (2022.01)

(52) U.S. Cl.
CPC ............... *H04L 63/0245* (2013.01); *G06F 2009/45587* (2013.01); *G06F 2009/45595* (2013.01); *H04L 69/22* (2013.01)

(58) Field of Classification Search
CPC ........... H04L 2101/622; G06F 9/45558; G06F 2009/45587; G06F 2009/45595
See application file for complete search history.

(56) References Cited

U.S. PATENT DOCUMENTS

| | | | |
|---|---|---|---|
| 2015/0215266 A1* | 7/2015 | Hernandez | ............ H04L 61/103 370/254 |
| 2016/0337231 A1* | 11/2016 | Dixon | ................... H04L 61/103 |
| 2018/0183761 A1 | 6/2018 | Gunda et al. | |
| 2018/0205673 A1 | 7/2018 | Jain et al. | |
| 2019/0068491 A1 | 2/2019 | Tsirkin | |
| 2019/0215200 A1 | 7/2019 | Uberoy et al. | |
| 2019/0306060 A1 | 10/2019 | Sharma et al. | |
| 2020/0296077 A1 | 9/2020 | Poon et al. | |

OTHER PUBLICATIONS

Plummer, David, "An Ethernet Address Resolution Protocol", Network Working Group, dated Nov. 1982, 10 pages.

Gross et al., "Geneve: Generic Network Virtualization Encapsulation draft-grossgeneve-00", Network Working Group, dated Feb. 14, 2014, 23 pages.

Cisco, "Encapsulation Techniques: Generic Network Virtualization Encapsulation, VXLAN Generic Protocol Extension, and Network Service Header", dated 2014, 3 pages.

Address Resolution Protocol, "Relates to Lab 2"., dated Aug. 2018, 6 pages.

U.S. Appl. No. 16/351,083 Publication Notice, dated Sep. 17, 2020, 1 page.

U.S. Appl. No. 16/351,083 Non-Final Office Action dated Feb. 3, 2022, 18 pages.

U.S. Appl. No. 16/351,083, Notice of Allowance dated May 12, 2022, 18 pages.

U.S. Appl. No. 16/351,083, Issue Notification, received Aug. 10, 2022, 1 page.

U.S. Appl. No. 17/872,846 Non-Final Office Action dated Apr. 13, 2022, 23 pages.

U.S. Appl. No. 17/872,846, Notice of Allowance dated Nov. 28, 2023, 20 pages.

U.S. Appl. No. 17/872,846, Issue Notification, received Mar. 3, 2024, 2 page.

\* cited by examiner

FIG. 2A

| 202 Examples of Conventional Rules for a Firewall | | | |
|---|---|---|---|
| Source | Destination | Protocol | Action |
| IP/MAC Addr of Src-1 | IP/MAC Addr of Dest-1 | Prot-1 | Block |
| IP/MAC Addr of Src-2 | IP/MAC Addr of Dest-2 | Prot-2 | Block |
| Any | IP/MAC Addr of Dest-3 | Prot-2 | Allow |
| ... | | | |

FIG. 2B

| 212 Examples of Enhanced Rules for a Firewall | | | |
|---|---|---|---|
| Source | Destination | Protocol | Action |
| UserA | UserC | Prot-1 | Allow |
| UserB | Process4 | Prot-2 | Block |
| Process1 | Process4 | Prot-2 | Allow |
| Process2 | UserZ | Prot-1 | Block |
| ... | | | |

FIG. 5

| 502 Example Table Maintained by a Central Controller | | |
|---|---|---|
| Address | Users, Processes | LPs |
| IP/MAC Address1 (Host 133) | UserA | LP33 |
| IP/MAC Address2 (Host 133) | Process1 | LP6 |
| IP/MAC Address5 (Host 143) | Process12 | LP6 |
| IP/MAC Address6 (Host 143) | UserB | LP7 |
| IP/MAC Address7 (Host 143) | UserZ | LP8 |
| IP/MAC Address8 (Host 143) | Process3 | LP88 |

ARP-BASED ANNOTATIONS FOR VIRTUAL MACHINES

CROSS-REFERENCE TO RELATED APPLICATION

This application is a continuation of U.S. patent application Ser. No. 17/872,846 filed Jul. 25, 2022, entitled "Method for Enabling Enhanced Firewall Rules Via ARP-Based Annotations", of which is a continuation of U.S. patent application Ser. No. 16/351,083 filed Mar. 12, 2019, entitled "Method for Enabling Enhanced Firewall Rules Via ARP-Based Annotations", the entirety of which both are incorporated herein by reference.

BACKGROUND

Recent developments in network security include implementations that allow incorporating identifiers of logical ports in firewall rules. Such implementations, however, require that a distributed firewall kernel obtains mappings between IP/MAC addresses and identifiers of logical ports of entities implemented in the network. The firewall kernel may learn the mappings on a sender side in many ways; some approaches are described in U.S. Published Patent Application No. 2018/0205673, entitled "Managing Network Traffic in Virtual Switches Based on Logical Port Identifiers," which is incorporated herein by reference in its entirety.

In one approach, a firewall learns the mappings from a central controller. A central controller is an advanced distributed state management system that controls virtualized networks and overlay transport tunnels and is used to maintain information about virtual machines, hosts, and logical switches implemented in the networks. The firewall may determine a mapping between an IP/MAC address and a logical port identifier assigned to a virtual machine when the central controller implements the assignment of the port to the virtual machine to let the machine join a logical switch in the network.

A mapping between an IP/MAC address and an identifier of a logical port used by a virtual machine may be also learned on demand. For example, it may be learned when a first IP packet of the packet flow leaves the logical port assigned to the machine and when an association between the IP/MAC address and the identifier of the logical port is configured.

However, since some firewall rules on a sender side may use identifiers of logical ports configured on a receiver side, the firewall needs to also obtain mappings between IP/MAC addresses and logical ports assigned to the destination machines. One way to learn the mappings is during a TCP/IP three-way handshake performed with a central controller. For example, the firewall kernel may learn an identifier of a logical port of a destination virtual machine once an initial synchronization request is transmitted to the central controller and the central controller is queried for the port information.

In addition to expanding the firewall rule space to include the rules that incorporate identifiers of logical ports, it would be desirable to include the rules that incorporate identifiers of processes executing on virtual machines and identifiers of users using the machines. For example, it would be desirable to include the rules that, for example, block traffic transmitted from a particular user on a sender side to a particular user on a receiver side, allow traffic transmitted from the particular user on the sender side to a particular process executed on the receiver side, and so forth. However, determining the identifiers of the users/processes in a virtualized network is difficult even when the approaches similar to those for obtaining port identifiers are available.

SUMMARY

Described herein is technology for enabling enhanced firewall rules in a computer network via Address Resolution Protocol ("ARP") annotations. Conventionally, the ARP is used to resolve a MAC address that matches an IP address received from a requestor in an ARP request, and to return the matching MAC address in an ARP response to the requestor. The extensions described herein take an advantage of the concept of ARP requests and ARP responses; however, in this approach, the ARP requests/responses are not used to resolve addresses of machines. Instead, the ARP requests are used here as communications vehicles for hypervisors executing on hosts to transmit, to a central controller, context information about users and processes executing on the corresponding hosts, while the ARP responses are used as communications vehicles for the central controller to disseminate, to hypervisors, context information about the users and processes that are executing on other hosts. Communicating the context information using the ARP requests and ARP responses is faster and more efficient than communicating the context information via, for example, TCP sessions, as it takes some time to establish the TCP sessions. Communicating the context information using the ARP requests and ARP responses is faster and more efficient than communicating the context information in conventional Genevie headers of the packets.

In one approach, ARP requests and ARP responses are exchanged between hypervisors and a central controller that are implemented in the network to allow the hypervisors and the controller to collect context information about users and processes reachable via the network. Exemplary context-based distributed firewall technology is described, for example, in U.S. Patent Application Publication 2018/0183759, entitled "Context Based Firewall Services for Data Message Flows for Multiple Concurrent Users on one Machine," published on Jun. 28, 2018, and incorporated herein by reference. An exemplary approach for distributing, from an in-guest agent, context information that includes user identifiers and application identifiers is described, for example, in U.S. Patent Application Publication 2018/0183761, entitled "Performing APPID Based Firewall Services on a Host," published on Jun. 28, 2018, and incorporated herein by reference.

In an embodiment, ARP requests and ARP responses carrying context information for users/processes are piggy-backed on real ARP packets, or attached to dummy ARP packets that are treated as genuine ARP traffic by middle-boxes such as firewalls, intrusion detection services, and the like. Therefore, they are permitted to be forwarded to their destination.

Context information determined for a user or a process reachable in a virtualized network may include an identifier of a user who launched an application or initiated the process, a name of the process, a geo-location (if such is available) of a workstation that is used by the user, a software install specification, a software version of the install, an identification of an SQL database if such is used, and the like.

In an embodiment, hypervisors provide context information about users/processes to a central controller and the controller disseminates the information to other hypervisors that have not yet received that information. Upon receiving the context information about the users/processes, the hypervisors store the context information for the users/processes in associations with identifiers of the users/processes and enable firewall applications cooperating with the hypervisors to implement the firewall rules that use the identifiers of the users/processes as sources and/or destinations in the rule definitions.

The approach allows extending the functionalities of the ARP by using ARP requests and ARP responses as communications vehicles to carry context information about users/processes executing on hosts. The ARP is not used here to resolve a MAC address that matches an IP address received from a requestor in an ARP request, or to return the matching MAC address in an ARP response to the requestor. The extensions described herein take an advantage of the concept of ARP requests and ARP responses, and use the ARP requests/responses as communications vehicles for hypervisors executing on hosts to transmit, to a central controller, context information about users/processes executing on the corresponding hosts, while the ARP responses are used as communications vehicles for the central controller to disseminate, to hypervisors, context information about users/processes that are executing on other hosts.

In an embodiment, an approach extends the functionalities of the ARP to allow a hypervisor to include, in ARP requests, context information determined for users/processes detected on a host managed by the hypervisor. The hypervisor may encapsulate the ARP requests and transmit the encapsulated packets to a central controller. Once the central controller receives, from a hypervisor executing on a host, an encapsulated packet with an ARP request and context information about a process executing the host, the central controller may decapsulate the packet, extract the context information from the decapsulated packet, and update its own table with the extracted context information. Furthermore, the central controller may disseminate the context information in an encapsulated ARP response to other hypervisors on other hosts to allow the other hypervisors to learn about the user/processes executing on the host. The hosts store the context information about the users/processes in tables called guest attribute tables.

The approach allows a distributed firewall to learn, from guest attribute tables, the identifiers of users/processes on a sender side and on a receiver side before a first TCP packet leaves a source virtual machine. This allows the firewall to define and implement enhanced firewall rules that use the identifiers of users/processes as sources and/or destinations, not just IP/MAC addresses. An example of enhanced firewall rule includes the rule that, for example, blocks traffic transmitted from a particular user on the sender side to a particular process on a receiver side.

When the information about destination users/processes detected on a host on a receiver side is communicated to a hypervisor on a sender side, a distributed firewall module may enforce the enhanced firewall rules on the sender side quickly, efficiently, and without a need for querying a central controller for context information for the destination users/processes.

BRIEF DESCRIPTION OF THE DRAWINGS

In the drawings:

FIG. 2A is a block diagram depicting examples of firewall rules.

FIG. 2B is a block diagram depicting examples of enhanced firewall rules.

FIG. 5 is an example table maintained by a central controller.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
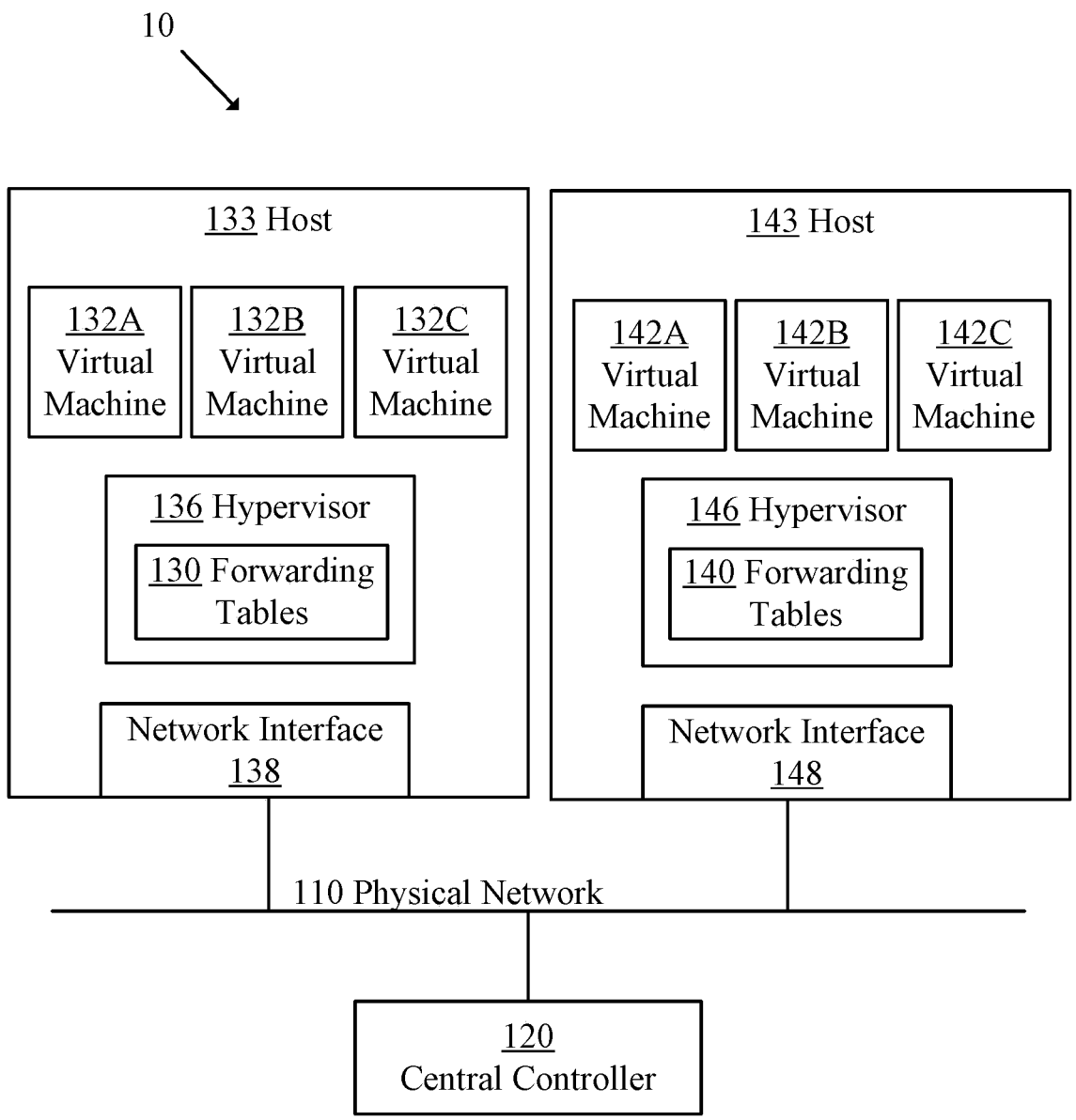
FIG. 1 is a block diagram depicting an example physical implementation view of an example logical network environment for implementing mechanisms for enhancing scopes of firewall rules.

FIG. 1 is a block diagram depicting an example physical implementation view of an example logical network environment for implementing mechanisms for enhancing scopes of firewall rules. In the depicted example, environment 10 includes hosts 133 and 143 that implement virtual machines ("VMs") 132A, 132B, 132C, 142A, 142B, and 142C, hypervisors 136 and 146, and network interfaces 138 and 148. A hypervisor is computer software, firmware or hardware that creates and executes virtual machines. A computer on which the hypervisor executes the virtual machines is called a host computer. Environment 10 also includes a physical network 110, and a central controller 120. Environment 10 may include additional elements, such as routers, switches, and gateways (not shown).

Host 133 is a computer device configured to implement virtual machines such as VMs 132A, 132B, and 132C, while host 143 is a computer device configured to implement VMs 142A, 142B, and 142C. Hosts 133/143 may also implement additional VMs, edge service gateways, logical routers, and logical switches (not shown). Each host 133/143 may be referred to as a computing device, a host computer, a host device, a physical server, a server system, or a physical machine. Hosts 133/143 may each comprise a commodity hardware computing platform including one or more processors, one or more memory units, one or more physical network interface cards, and one or more storage devices (not shown). Hosts 133/143 may support execution of firewall applications including, for example, a distributed firewall. The firewall may implement firewall rules such as rules described in FIG. 2A-2B.

Virtual machines 132A, 132B, 132C, 142A, 142B, and 142C are executed on hosts 133, 143, respectively, and are examples of virtualized computing instances or workloads. A virtualized computing instance may include an addressable data compute node or an isolated user space instance, often referred to as name space containers. VMs may implement, server applications, client applications, desktops, edge nodes, edge node gateways, and the like.

In an embodiment, host 133/143 is configured to support execution of a hypervisor 136/146. A hypervisor is a software layer or component that supports the execution of the VMs. Hypervisor 136/146 may also be configured to implement virtual switches and forwarding tables 130/140 that communicate traffic between the VMs. In certain embodiments, the virtual switches and other components may reside in a privileged virtual machine, sometimes referred to as a "Domain Zero" or a "root partition" (not shown). Hypervisor 136/146 may also maintain mappings between underlying hardware components and virtual resources allocated to the respective VMs. The hardware components may include computer processors, memory units, physical network interface cards, and storage devices.

Host 133 may include a network interface 138, while host 143 may include a network interface 148. Network interface 138 may be used to facilitate communications between host 133 and physical network 110, while network interface 148 may be used to facilitate communications between host 143 and physical network 110.

Central controller 120 may be used to manage and provide control plane information to virtual switches implemented in hosts 133 and 143. Central controller 120 may comprise communications interfaces, network interfaces, processing systems, computer systems, microprocessors, storage systems, storage media, and/or other processing devices or software systems, and can be distributed among multiple devices. Central controller 120 may also include software such as operating systems, logs, databases, utilities, drivers, natural language processing software, networking software, and other software applications.

2. Examples of Firewall Rules 2.1. Examples of Conventional Firewall Rules

Generally, firewall rules are applied to context information included in individual packets to determine whether to block or allow the packets. Some firewall rules may be implemented globally for the entire network, while other firewall rules may be implemented locally by the hosts. Typically, a firewall rule is defined by specifying a packet source, a packet destination, a protocol identifier and an action to be performed when the context information of the packet matches the source, the destination and the protocol identifier included in the rule.

FIG. 2A is a block diagram depicting examples of firewall rules. Examples 202 depicted in FIG. 2A include conventional firewall rules in which the sources and destinations are specified by IP/MAC addresses. For example, a rule 204 in examples 202 includes an IP/MAC address of a Src-1 as a source, an IP/MAC address of Dest-1 as a destination, a Prot-1 identifier as a protocol, and an action block as the action to be performed on a packet if the packet's source, destination and protocol match the rule definition.

Other firewall rules may include identifiers of logical ports assigned to virtual machines and may use the identifiers to determine whether to block or allow the packets.

2.2. Examples of Enhanced Firewall Rules

FIG. 2B is a block diagram depicting examples of enhanced firewall rules. Examples 212 depicted in FIG. 2B include the rules that use identifiers of users/processes to define sources and/or destination in the rules. For example, a rule 214 in examples 212 includes a UserA identifier to define a source, and a UserC identifier to define a destination. Rule 214 may be interpreted as follows: a packet that is transmitted from UserA to UserC and in accordance with a Prot-1 should be allowed.

3. Example Approach for Enhancing Scopes of Firewall Rules

Figure 3:
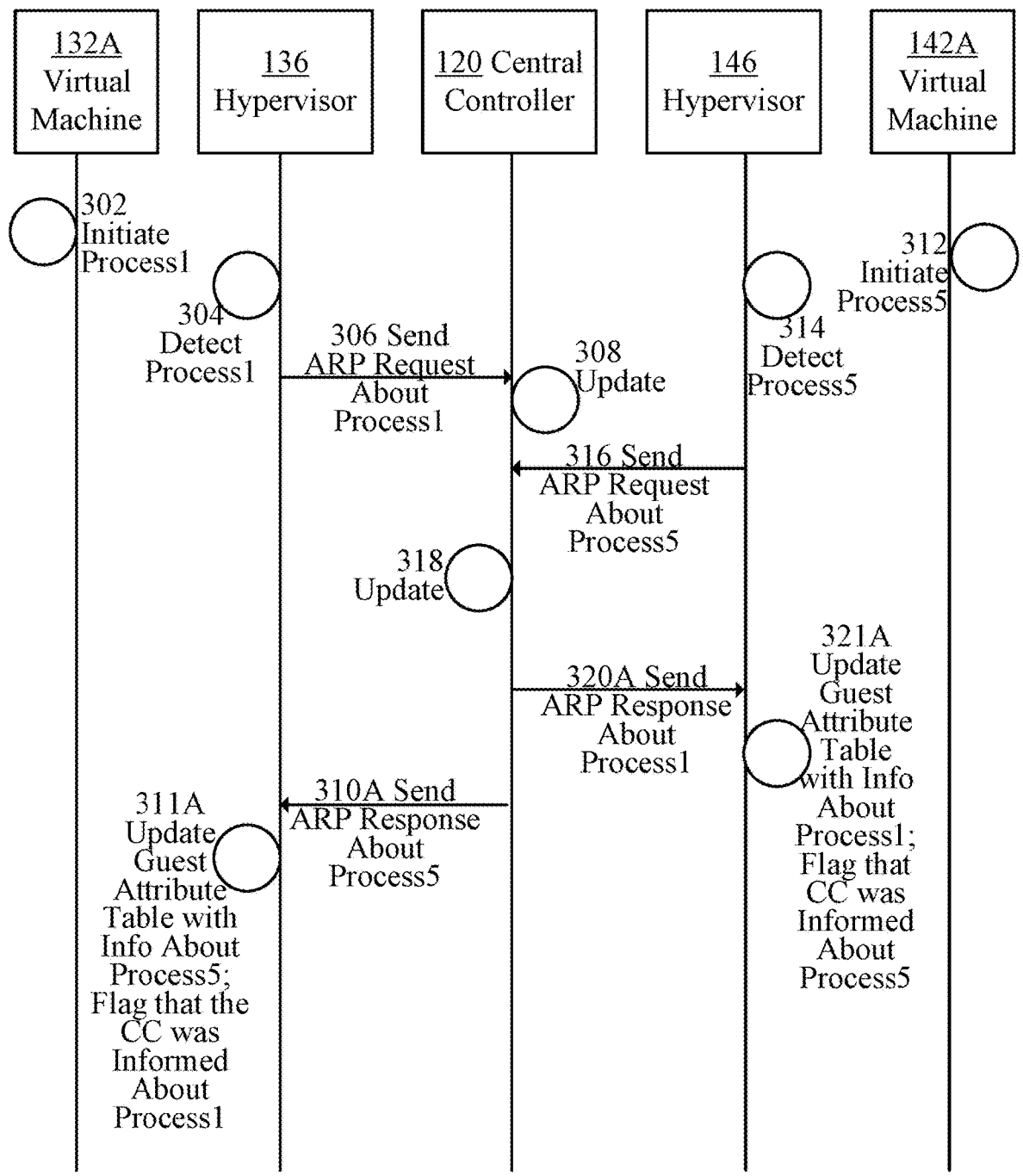
FIG. 3 is a block diagram depicting an example time chart for implementing mechanisms for enhancing scopes of firewall rules.
Figure 6:
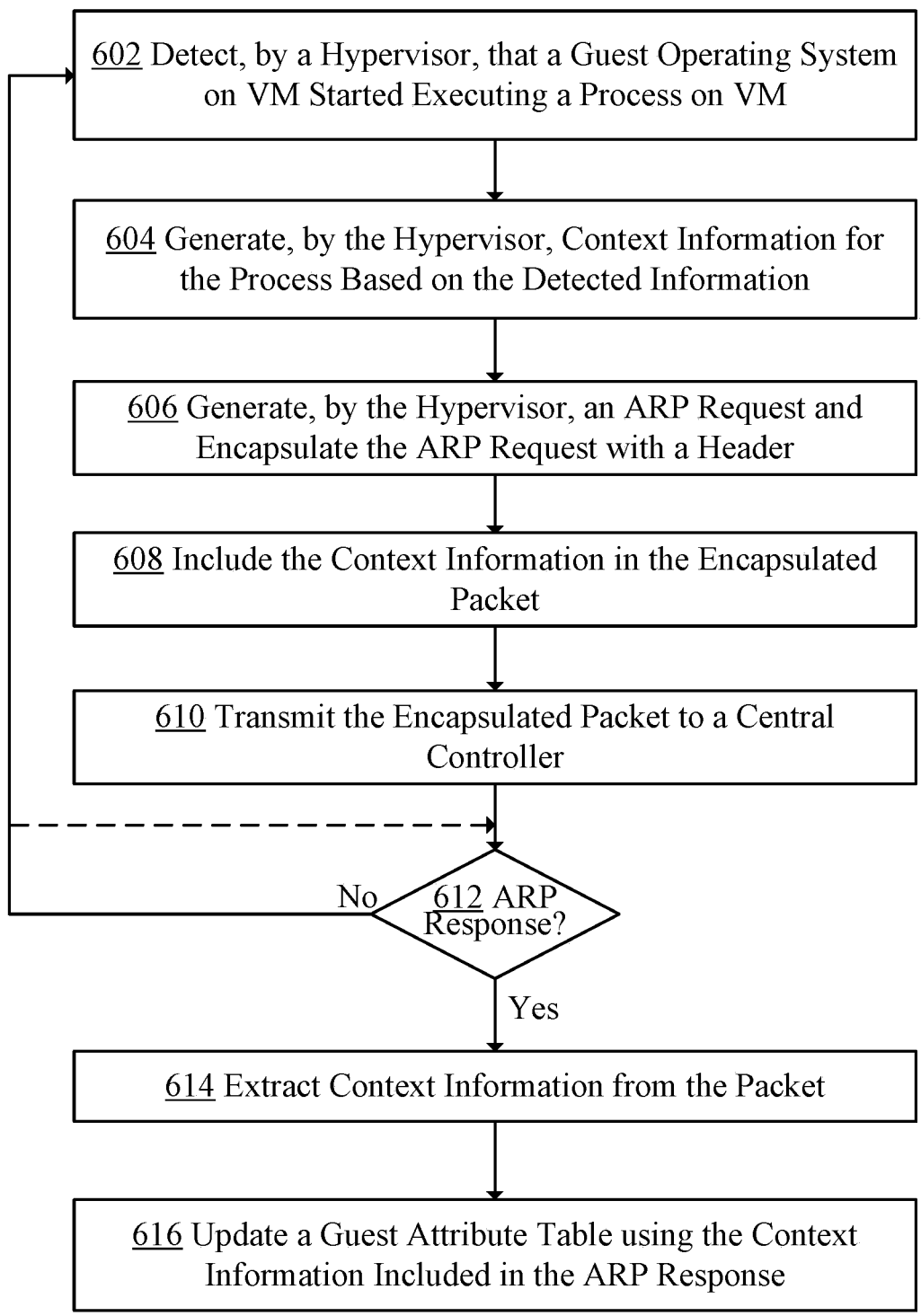
FIG. 6 is an example flow chart for implementing mechanisms for enhancing scopes of firewall rules.

An example implementation of the mechanisms for enhancing scopes of firewall rules may be described in reference to both FIG. 3 and FIG. 6, wherein FIG. 3 is a block diagram depicting an example time chart for implementing mechanisms for enhancing scopes of firewall rules, while FIG. 6 is an example flow chart for implementing the mechanisms.

3.1. Detecting Processes/Users by Hypervisors

Referring first to FIG. 3, suppose that a guest operating system executing on VM 132A, which is implemented on host 133, initiates (step 302 in FIG. 3) execution of a Process1 ("Process1"). Examples of processes include an Internet Explorer client application that a user launches on VM 132A or a Firefox client application that a user launches on VM 132A.

The execution of Process1 on VM 132A may be detected (step 304 in FIG. 3) by hypervisor 136. This corresponds to step 602 in FIG. 6. For example, hypervisor 136 may receive state information pertaining to Process1 that the driver or guest agent executing on VM 132A sent to hypervisor 136 via a hypercall or other communication mechanism.

3.2. Determining Context Information for a Process

Upon detecting that the execution of Process1 has started, hypervisor 136 determines context information for Process1. This corresponds to step 604 in FIG. 6.

Context information determined for a process or a user includes information that captures characteristics, states, resources, or other data pertaining to the process or the user. The context information may include different types of information, and the types of information may depend on the type of the process that started executing on VM 132A. If the launched process is, for example, an Internet Explorer client application, then context information for the process may include an identifier of a user who launched the executable, a name of the process, a geo-location (if such is available) of a workstation that is used by the user, a software install specification, a software version, and the like.

3.3. Generating and Encapsulating an ARP Request

Once hypervisor 136 determined the context information for Process1, hypervisor 136 generates an ARP request and encapsulates the ARP request with a header or headers to form an encapsulated packet. This corresponds to step 606 in FIG. 6.

The type of encapsulation used to encapsulate an ARP request may depend on the implementation. In one implementation, an ARP request is encapsulated with a Geneve Network Virtualization Encapsulation ("Geneve") header. A typical encapsulated packet that includes an ARP request may have an outer Ethernet header, an outer IPv4/IPv6 header, an outer UDP header, a Geneve header, an inner Ethernet header, a payload and a frame check sequence field. The resulting packet is referred to as an encapsulated packet. Other types of encapsulation may also be implemented.

Hypervisor 136 may copy the context information determined for Process1 either to a Geneve header or to a payload field of the packet. Selecting the field in which the context information may be stored may depend on the implementation, and examples are described in FIG. 4A-4B. Storing the context information in the packet corresponds to step 608 in FIG. 6.

Once hypervisor 136 encapsulates the packet comprising the ARP request and the context information of Process1, hypervisor 136 transmits (step 306 in FIG. 3) the encapsulated packet to central controller 120. This corresponds to step 610 in FIG. 6.

In an embodiment, the encapsulated packet is transmitted only to central controller 120, and not broadcast to the entire network. While a typical ARP request is broadcast using the Ethernet broadcast address and an Ethernet protocol type of value 0x806 to all systems in the same LAN domain, the encapsulated packet comprising the ARP request is transmitted in the presented approach only to central controller 120.

3.4. Processing an ARP Request by a Central Controller

Upon receiving the encapsulated packet, central controller 120 decapsulates the packet, and determines whether the decapsulated packet includes an ARP request. If it does, then central controller 120 extracts, from the decapsulated packet, the context information of, for example, Process1 that is executing on VM 132A of host 133.

In an embodiment, central controller 120 uses the context information of Process1 to update (step 308 in FIG. 3) its own table that captures a mapping between IP/MAC addresses of Process1, an identifier of Process1, and optionally an identifier of a logical port. An example of table maintained by central controller 120 is a table described in FIG. 5.

3.5. Example Table Maintained by a Central Controller

FIG. 5 is an example table maintained by a central controller. An example table 502 includes mappings between IP/MAC addresses of sources, identifiers of users/processes that are associated with the corresponding IP/MAC addresses, and optionally, identifiers of logical ports.

In an embodiment, table 502 includes three columns: a first column is used to store IP/MAC addresses of sources, a second column is used to store corresponding identifiers of users/processes, and a third column is used to store corresponding identifiers of logical ports. Table 502 may include, for example, a mapping 504 that maps an IP/MAC address on host 133 and an identifier 506 of a UserA ("UserA") onto an identifier LP33 508 of a logical port.

In an embodiment, central controller 120 creates or updates its own table 502 based on context information received from hypervisors, such as hypervisor 136 and hypervisor 146. For example, as central controller 120 receives context information determined for Process1 from hypervisor 136, central controller 120 may receive other context information determined for another process and sent by another hypervisor, such as hypervisor 146. Upon receiving context information from hypervisor 136, central controller 120 updates its own table and transmits the context information to other hypervisors, such as hypervisor 146 so that hypervisor 146 can learn context information about users/processes reported by hypervisor 136.

3.6. Detecting Other Processes by Other Hypervisors

Referring again to FIG. 3, suppose that a guest operating system executing on VM 142A, which is implemented on host 143, initiates (step 312 in FIG. 3) execution of a process. Suppose that the process is a Process5 ("Process5"). Examples of Process5 include an Internet Explorer client application that a user launches on VM 142A or a Firefox client application that a user launches on VM 142A.

The execution of Process5 on VM 142A may be detected (step 314 in FIG. 3) by hypervisor 146. For example, hypervisor 146 may receive state information pertaining to Process5 indicating that Process5 is executing on VM 142A.

3.7. Generating ARP Requests for Other Processes

Upon detecting that the execution of Process5 has started, hypervisor 146 determines context information for Process5. This step is similar to determining context information for Process1, described above.

Once hypervisor 146 determines the context information for Process5, hypervisor 146 generates an ARP request and encapsulates the ARP request with a header or headers to form an encapsulated packet. This step is similar to generating an encapsulated packet for Process1, described above. Selection of a field for storing the context information determined for Process5 may depend on the implementation. Example implementations are described in FIG. 4A-4B.

Then, hypervisor 146 transmits (step 316 of FIG. 3) the encapsulated packet to central controller 120.

3.8. Processing Other ARP Requests by a Central Controller

Upon receiving the encapsulated packet, central controller 120 decapsulates the packet, and determines whether the decapsulated packet includes an ARP request. If it does, then central controller 120 extracts, from the decapsulated packet, the context information of Process5 that is executing on VM 142A of host 143. Central controller 120 may use the context information of Process5 to update its own table that captures the mappings between IP/MAC addresses of users/processes, identifiers of the users/processes, and optionally identifiers of corresponding logical ports. An example of table maintained by central controller 120 includes a table described in FIG. 5.

3.9. Generating ARP Responses by a Central Controller

As central controller 120 receives, from hypervisors, encapsulated packets comprising ARP requests and context information, central controller 120 extracts, from the packets, the context information about users/processes, uses the extracted context information to update its own table to keep track of the users/processes reported by the hypervisors in the packets, and generates and transmits encapsulated ARP responses to communicate the context information about the users/processes to other hypervisors. For example, in response to receiving, from hypervisor 136 executing on host 133, an encapsulated packet with an ARP request and context information determined for Process1, central controller 120 uses the context information determined for Process1 to update its own table and to generate an ARP response, and transmits the encapsulated ARP response (step 320A in FIG. 3) to hypervisor 146 so that hypervisor 146 can update its own tables and learn that Process1 is executed on host 133.

Furthermore, in response to receiving, from hypervisor 146 executing on host 143, an encapsulated packet with an ARP request and context information determined for Process5, central controller 120 uses the context information determined for Process5 to update its own table and to generate an ARP response, and transmits the encapsulated ARP response (step 310A in FIG. 3) to hypervisor 136 so that hypervisor 136 can update its own tables and learn that Process5 is executed on host 143.

3.10. Processing ARP Responses by Hypervisors

In an embodiment, a hypervisor creates or updates its own guest attribute table based on context information received from central controller 120. For example, hypervisor 136 may receive from central controller 120 context information determined for Process5, while hypervisor 146 may receive context information determined for Process1. Upon receiving the context information for Process5, hypervisor 136 may update its own guest attribute table to include the context information about Process5, while hypervisor 146, upon receiving the context information about Process1, may update its own guest attribute table to include the context information about Process1.

Specifically, upon receiving an encapsulated packet, hypervisor 136 decapsulates the packet, and determines whether the decapsulated packet includes an ARP response. If hypervisor 136 determines (step 612 in FIG. 6) that the decapsulated packet includes an ARP response, then hypervisor 136 extracts (step 614 in FIG. 6) context information from the decapsulated packet, determines that the context information pertains to Process5 that is executing on VM 142A of host 143, and uses the context information to update (step 616 in FIG. 6 and also step 311A in FIG. 3) its own guest attribute table to include a data record indicating a mapping between an IP/MAC address of Process5, an identifier of Process5, and optionally, an identifier of a logical port used by Process5. Hypervisor 136 may also include in its own guest attribute table the context information about Process1 and set a flag to indicate that central controller 120 was informed about Process1 executing on host 133.

Upon receiving an encapsulated packet, hypervisor 146 decapsulates the packet, and determines whether the decapsulated packet includes an ARP response. If hypervisor 146 determines that the decapsulated packet includes an ARP response, then hypervisor 146 extracts context information from the decapsulated packet, determines that the context information pertains to Process1 that is executing on VM 132A of host 133, and uses the context information to update (step 321A in FIG. 3) its own guest attribute table to include a data record indicating a mapping between an IP/MAC address of Process1, an indicator of Process1, and optionally, an identifier of a logical port used by Process1. Hypervisor 146 may also include in its own guest attribute table the context information about Process5 and set a flag to indicate that central controller 120 was informed about Process5 executing on host 143.

A guest attribute table maintained by a hypervisor may be similar to a table maintained by a central controller, such as example table 502 maintained by central controller 120. The guest attribute table maintained by a hypervisor may include mappings between IP/MAC addresses of sources, identifiers of users/processes that are associated with the corresponding IP/MAC addresses, and optionally, identifiers of logical ports. The guest attribute tables maintained by hypervisors on sender and receiver sides may be accessed by a distributed firewall application to define and enforce firewall rules that include identifiers of users/processes as sources and destinations.

4. Encoding Context Information in ARP Messages

Figure 4A:
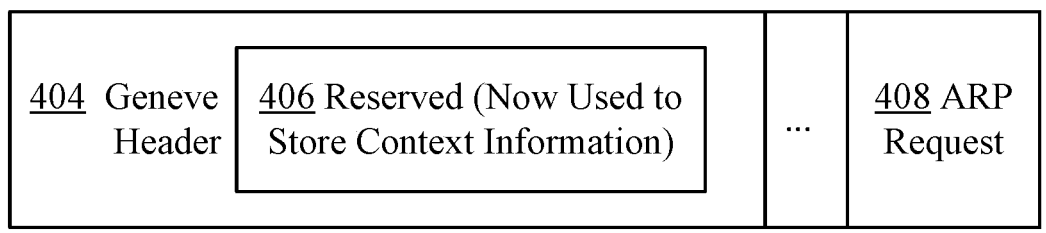
FIG. 4A is an example implementation of encoding context information in a reserved field of a Geneve header of a packet.
Figure 4B:
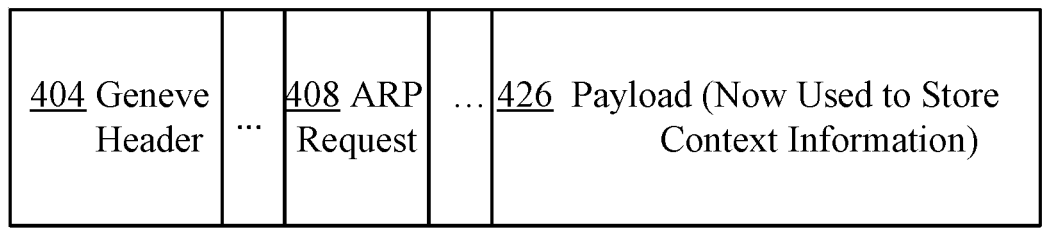
FIG. 4B is an example implementation of encoding context information in a payload field of a packet.

Context information determined for users/processes by hypervisors may be communicated between the hypervisors, a central controller and other hypervisors in many ways. One way is to include the context information in a certain field of an encapsulated packet that carries an ARP request or that carries an ARP response. Examples of such a field include a reserved field 406 of a Geneve header 404 of the encapsulated packet, as shown in FIG. 4A, and a payload field 426 of the encapsulated packet that carries an ARP request 408 and a Geneve header 404, as shown in FIG. 4B. In other embodiments, the context information may be stored in other fields.

FIG. 4A is an example implementation of encoding context information in reserved field 406 of Geneve header 404 of a packet. In the depicted example, the packet is an encapsulated packet and comprises ARP request 408. The encapsulated packet may include additional headers. In this example, reserved field 406 of the encapsulated packet is used to store the context information corresponding to attributes of a process that is executing by a guest operating system on a VM hosted by a host. Since reserved field 406 is not used by entities in the network for any other purposes at the moment, including the context information in reserved field 406 does not negatively impact the processing of the packet.

FIG. 4B is an example implementation of encoding context information in payload field 426 of a packet. In the depicted example, an encapsulated packet comprises Geneve header 404, ARP request 408, and payload 426. The encapsulated packet may, however, include additional headers. In this example, payload field 426 of the encapsulated packet is used to store the context information corresponding to attributes of a process that is executing by a guest operating system on a host. Since the payload of the encapsulated packet carrying the ARP request is not used by entities in the network for any other purposes at the moment, including the context information in payload field 426 does not negatively impact any other processing.

5. Improvements Provided by Certain Embodiments

In an embodiment, an approach presented herein provides mechanisms for enabling enhanced firewall rules in computer networks via ARP annotations. The approach includes exchanging ARP requests and ARP responses between hypervisors and a central controller that are implemented in the network to allow the controller and the hypervisors to collect context information about users and/or processes reachable via the network.

In an embodiment, the approach allows enhancing scopes of firewall rules by allowing to define and implement the rules that incorporate identifiers of processes executing on virtual machines and identifiers of users using the machines. The approach allows, for example, defining the rules that block traffic transmitted from a particular user on a sender side to a particular user on a receiver side.

6. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip ("SoC"), or other type of hardware processor.

Main memory may be a random-access memory ("RAM") or other dynamic storage device. It may be coupled to a communications bus and used for storing information and software instructions to be executed by a processor. Main memory may also be used for storing temporary variables or other intermediate information during execution of software instructions to be executed by one or more processors.

7. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A method, comprising:
   detecting that a guest operating system executing on a first virtual machine is executing a first process on a first host computer;
   determining first context information for the first process;
   generating a first Address Resolution Protocol ("ARP") request;
   including the first context information and the first ARP request in a first packet; and
   transmitting the first packet to a central controller as an indication that the first process is executing on the first host computer.

2. The method of claim 1, further comprising:
   in response to receiving an ARP response packet from the central controller:
   extracting second context information from the ARP response packet;
   based on the second context information, determining that a second process is executing on a second host computer; and
   updating a guest attribute table using the second context information to indicate that the second process is executing on the second host computer.

3. The method of claim 1, further comprising:
   detecting that a user is executing one or more processes on the first host computer;
   generating second context information determined for the user;
   generating a second ARP request;
   including the second context information and the second ARP request in a second packet; and
   transmitting the second packet to the central controller as an indication that the user is executing one or more processes on the first host computer.

4. The method of claim 1, further comprising:
   in response to receiving an ARP response packet from the central controller:
   extracting second context information from the ARP response packet;
   based on the second context information, determining that a user is executing one or more processes on a second host computer; and
   updating a guest attribute table using the second context information to indicate that the user is executing one or more processes on the second host computer.

5. The method of claim 1, wherein the first context information is included in a reserved field of a Geneve Network Virtualization Encapsulation ("Geneve") header of the first packet.

6. The method of claim 1, wherein a hypervisor running on the first host computer detects the that the guest operating system is executing the first process.

7. One or more non-transitory computer-readable storage media storing one or more computer instructions which, when executed by one or more processors, cause the one or more processors to perform a plurality of operations, comprising:
   detecting that a guest operating system executing on a first virtual machine is executing a first process on a first host computer;
   determining first context information for the first process;
   generating a first Address Resolution Protocol ("ARP") request;
   including the first context information and the first ARP request in a first packet; and
   transmitting the first packet to a central controller as an indication that the first process is executing on the first host computer.

8. The one or more non-transitory computer-readable storage media of claim 7, wherein the plurality of operations further comprises:
   in response to receiving an ARP response packet from the central controller:
   extracting second context information from the ARP response packet;
   based on the second context information, determining that a second process is executing on a second host computer; and
   updating a guest attribute table using the second context information to indicate that the second process is executing on the second host computer.

9. The one or more non-transitory computer-readable storage media of claim 7, wherein the plurality of operations further comprises:
   detecting that a user is executing one or more processes on the first host computer;
   generating second context information determined for the user;
   generating a second ARP request;
   including the second context information and the second ARP request in a second packet; and
   transmitting the second packet to the central controller as an indication that the user is executing one or more processes on the first host computer.

10. The one or more non-transitory computer-readable storage media of claim 7, wherein the plurality of operations further comprises:
    in response to receiving an ARP response packet from the central controller:
    extracting second context information from the ARP response packet;
    based on the second context information, determining that a user is executing one or more processes on a second host computer; and updating a guest attribute table using the second context information to indicate that the user is executing one or more processes on the second host computer.

11. The one or more non-transitory computer-readable storage media of claim 7, wherein the first context information is included in a reserved field of a Geneve Network Virtualization Encapsulation ("Geneve") header of the first packet.

12. The one or more non-transitory computer-readable storage media of claim 7, wherein the first context information is included in a payload of the first packet.

13. The one or more non-transitory computer-readable storage media of claim 7, wherein the plurality of operations further comprises:
   in response receiving an ARP response packet from the central controller, updating a guest attribute table to indicate that the central controller was notified about the first process executing on the first host computer.

14. A first host computer comprising one or more processors and one or more non-transitory computer-readable storage media storing one or more computer instructions which, when executed by the one or more processors, cause the one or more processors to perform the following a plurality of operations, the operations comprising:
   detecting that a guest operating system executing on a first virtual machine is executing a first process on the first host computer;
   determining first context information for the first process;
   generating a first Address Resolution Protocol ("ARP") request;
   including the first context information and the first ARP request in a first packet; and
   transmitting the first packet to a central controller as an indication that the first process is executing on the first host computer.

15. The first host computer of claim 14, wherein the plurality of operations further comprises:
   in response to receiving an ARP response packet from the central controller:
      extracting second context information from the ARP response packet;
      based on the second context information, determining that a second process is executing on a second host computer; and
      updating a guest attribute table using the second context information to indicate that the second process is executing on the second host computer.

16. The first host computer of claim 14, wherein the plurality of operations further comprises:
   detecting that a user is executing one or more processes on the first host computer;
   generating second context information determined for the user;
   generating a second ARP request;
   including the second context information and the second ARP request in a second packet; and
   transmitting the second packet to the central controller as an indication that the user is executing one or more processes on the first host computer.

17. The first host computer of claim 14, wherein the plurality of operations further comprises:
   in response to receiving an ARP response packet from the central controller:
      extracting second context information from the ARP response packet;
      based on the second context information, determining that a user is executing one or more processes on a second host computer; and
      updating a guest attribute table using the second context information to indicate that the user is executing one or more processes on the second host computer.

18. The first host computer of claim 14, wherein the first context information is included in a reserved field of a Geneve Network Virtualization Encapsulation ("Geneve") header of the first packet.

19. The first host computer of claim 14, wherein the first context information is included in a payload of the first packet.

20. The first host computer of claim 14, further comprising:
   in response to receiving an ARP response packet from the central controller, updating a guest attribute table to indicate that the central controller was notified about the first process executing on the first host computer.

* * * * *